US012137852B1

(12) United States Patent
Xu

(10) Patent No.: US 12,137,852 B1
(45) Date of Patent: Nov. 12, 2024

(54) APPLICATOR AND APPLICATION METHOD

(71) Applicant: Tuo Xu, Sichuan (CN)

(72) Inventor: Tuo Xu, Sichuan (CN)

( * ) Notice: Subject to any disclaimer, the term of this patent is extended or adjusted under 35 U.S.C. 154(b) by 0 days.

(21) Appl. No.: 18/533,769

(22) Filed: Dec. 8, 2023

(30) Foreign Application Priority Data

Nov. 15, 2023 (CN) ......................... 202323077841.6

(51) Int. Cl.

| | |
|---|---|
| ***A46B 11/06*** | (2006.01) |
| ***A47K 7/02*** | (2006.01) |
| ***A47K 7/04*** | (2006.01) |
| ***A47K 7/06*** | (2006.01) |
| ***B05C 1/00*** | (2006.01) |
| ***B43M 11/06*** | (2006.01) |

(52) U.S. Cl.

CPC ................ *A47K 7/06* (2013.01); *A47K 7/022* (2013.01); *A47K 7/028* (2013.01); *A47K 7/043* (2013.01); *B05C 1/00* (2013.01); *B43M 11/06* (2013.01)

(58) Field of Classification Search

CPC .......... A47K 7/06; A47K 7/022; A47K 7/028; A47K 7/043

USPC ........................................... 401/6, 42, 188 R

See application file for complete search history.

(56) References Cited

U.S. PATENT DOCUMENTS

| | | | | | |
|---|---|---|---|---|---|
| 4,483,356 | A * | 11/1984 | Kales | A45D 34/04 | 15/210.1 |
| 6,325,564 | B1 * | 12/2001 | Knowles | A45D 34/042 | 401/289 |
| 6,655,866 | B1 * | 12/2003 | Morad | A47L 13/22 | 401/137 |

* cited by examiner

*Primary Examiner* — Jennifer C Chiang

(74) *Attorney, Agent, or Firm* — BEKIARES ELIEZER LLP

(57) ABSTRACT

Embodiments of the present disclosure provide an applicator and an application method. The applicator includes a connecting member, a drive member, a spray member, and an applicator head, wherein the drive member, the spray member, and the applicator head are mounted to the connecting member, and the drive member is configured to move relative to the connecting member to drive the spray member to spray liquid. The application method comprises: controlling the drive member to move and drive the spray member to move; spraying the liquid through the spray member; and controlling the applicator head to move for an application operation.

19 Claims, 3 Drawing Sheets

APPLICATOR AND APPLICATION METHOD

RELATED APPLICATION

This application claims the benefit of priority to Chinese Application No. 2023230778416 filed on Nov. 15, 2023, is hereby incorporated by reference herein in its entirety.

It is intended that the above-referenced application may be applicable to the concepts and embodiments disclosed herein, even if such concepts and embodiments are disclosed in the referenced applications with different limitations and configurations and described using different examples and terminology.

TECHNICAL FIELD

The present disclosure relates to the field of applicator tools and, more specifically, to an applicator and an application method.

BACKGROUND ART

The existing applicator is usually made of absorbent material such as a sponge, which needs to adsorb the liquid on the surface of the material in use, and then the adsorbed liquid is squeezed out by pressing, which is inconvenient to operate with one hand when applying to the back.

SUMMARY

The present disclosure provides an applicator and application method that can facilitate one-handed operation when applying to the back.

Embodiment of the present disclosure can be realized as follows.

Embodiment of the present disclosure provides an applicator, comprising:

a connecting member, a drive member, a spray member, and an applicator head, wherein the drive member, the spray member, and the applicator head are mounted to the connecting member, and the drive member is configured to move relative to the connecting member to drive the spray member to spray liquid.

Optionally, the spray member comprises an pressing head, an inner cylinder, and a nozzle, wherein the pressing head and the inner cylinder are housed in an inner cavity of the connecting member, the pressing head is connected to the drive member and cooperates with the inner cylinder, the nozzle is in communication with the inner cylinder, the inner cylinder is configured to hold a liquid, and the pressing head is configured to move relative to the inner cylinder to drive the nozzle to spray the liquid.

Optionally, the output end of the nozzle is flush with the cylinder wall of the connecting member.

Optionally, the applicator also comprises a fluid supply tank, wherein the fluid supply tank is communicated with the inner cylinder.

Optionally, the fluid supply tank comprises a tank and a fluid tube, wherein the tank is housed in an inner cavity of the applicator head, and the fluid tube is communicated between the tank and the inner cylinder.

Optionally, the inner cylinder comprises a first segment, a second segment and a third segment communicated in sequence, wherein the inner wall of the first segment cooperates with the pressing head, the third segment is connected to the nozzle, both the first segment and the third segment have an inner diameter greater than the inner diameter of the second segment.

Optionally, the inner diameter of the second segment is smaller than the inner diameter of the first segment, and the end surface of the second segment abuts against the pressing head.

Optionally, the spray member further comprises a rectifying ring, wherein the rectifying ring is installed in an inner cavity of the inner cylinder.

Optionally, the spray member also comprises a spring, wherein the spring is mounted in an inner cavity of the inner cylinder, and the two ends of the spring are connected to the rectifying ring and the pressing head, respectively.

Optionally, the pressing head comprises a pressing plate, a guide plate and a carrier plate connected in sequence, wherein the pressing plate cooperates with the inner cylinder and the carrier plate is connected to the drive member.

Optionally, an end surface of the carrier plate abuts against an end surface of the inner cylinder.

Optionally, the width of the end of guide plate close to the pressing plate is less than the width of the end of guide plate close to the carrier plate.

Optionally, the drive member comprises a toggle and a transmission rod that are connected, wherein the toggle penetrates the connecting member, the transmission rod is accommodated in an inner cavity of the connecting member, the end of transmission rod away from the toggle is connected to the spray member, and the toggle is configured to rotate relative to the connecting member to drive the spray member to move by means of the transmission rod.

Optionally, the toggle is provided with a pivot hole, the connecting member is provided with a pillar, and the pillar is accommodated in the pivot hole.

Optionally, the drive member further comprises a guide block, wherein the guide block is mounted on the transmission rod and cooperates with the connecting member.

Optionally, the transmission rod is provided with a guide groove, wherein the inner wall of the connecting member is provided with a limit post, and the limit post is accommodated in the guide groove.

Optionally, the applicator head is provided with oppositely disposed planar plate and spherical plate, and the applicator head is rotatably connected to the connecting member.

Optionally, the connecting member is of folding construction, and/or, the connecting member is of telescopic construction.

Embodiment of the present disclosure also provides an applicator, comprising:

a drive member, a connecting member, a spray member, a fluid supply tank, and an applicator head, wherein the drive member, the spray member, and the applicator head are mounted to the connecting member, wherein the fluid supply tank holds liquid and is in communication with the spray member, and the drive member is configured to move relative to the connecting member to drive the spray member to spray liquid.

Embodiment of the present disclosure also provides an application method, which is applied to an applicator, wherein the application method comprises:

controlling the drive member to move and drive the spray member to move;

spraying the liquid through the spray member; and controlling the applicator head to move for an application operation.

The applicator of embodiment of the present disclosure includes, for example, the following beneficial effects.

The applicator includes a connecting member, a drive member, a spray member, and an applicator head, wherein the drive member, the spray member, and the applicator head are mounted to the connecting member, and the drive member is configured to move relative to the connecting member to drive the spray member to spray liquid. The applicator in use can achieve the application effect by operating the drive member to drive the spray member to spray the liquid, and then moving the applicator head to contact with the liquid, and it can improve the convenience of one-handed operation when applying to the back.

BRIEF DESCRIPTION OF DRAWINGS

In order to more clearly illustrate the technical solutions of the embodiments of the present disclosure, the drawings to be used in the embodiments will be briefly introduced below, and it should be understood that the following drawings only show certain embodiments of the present disclosure, and therefore should not be regarded as a limitation of the scope, and for the person of ordinary skill in the art, other relevant drawings can be obtained based on the drawings without inventive effort.

Figure 1:
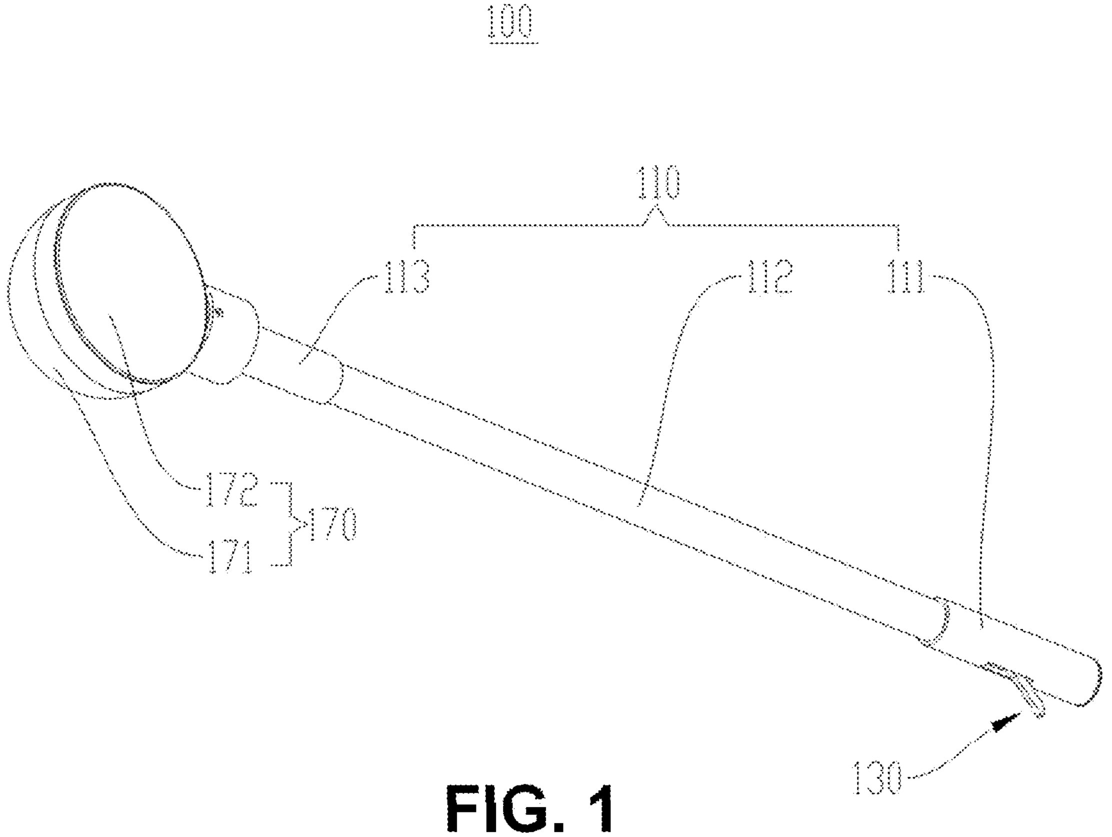
FIG. 1 is a structural schematic view of an applicator provided in an embodiment of the present disclosure in a first view.

Reference numerals: 100-applicator; 110-connecting member; 111-handle portion; 1111-pillar; 1112-extension groove; 112-extension portion; 113-shield portion; 119-limit post; 130-drive member; 131-toggle; 1311-pivot hole; 132-transmission rob; 1321-guide groove; 133-guide block; 150-spray member; 151-pressing head; 1511-pressing plate; 1512-guide plate; 1513-carrier plate; 152-inner cylinder; 1521-first segment; 1522-second segment; 1523-third segment; 153-nozzle; 154-liquid supply tank; 1541-tank; 1542-liquid tube; 155-rectifying ring; 1551-center hole; 156-spring; 170-applicator head; 171-spherical plate; 172-planar plate.

DETAILED DESCRIPTION OF EMBODIMENTS

In order to make the objects, technical solutions and advantages of the embodiments of the present disclosure clearer, the technical solutions in the embodiments of the present disclosure will be described clearly and completely in the following in connection with the drawings in the embodiments of the present disclosure, and it is obvious that the described embodiments are a part of the embodiments of the present disclosure and not all of the embodiments. The components of embodiments of the present disclosure generally described and illustrated in the drawings herein can be arranged and designed in a variety of different configurations.

Accordingly, the following detailed description of embodiments of the present disclosure provided in the drawings is not intended to limit the scope of the present disclosure for which protection is claimed, but rather represents only selected embodiments of the present disclosure. Based on the embodiments in the present disclosure, all other embodiments obtained by a person of ordinary skill in the art without inventive effort fall within the scope of protection of the present disclosure.

It should be noted: similar symbols and letters denote similar items in the following drawings, so that once an item is defined in a drawing, no further definition or explanation of it is required in the subsequent drawings.

In the description of the present disclosure, it is to be noted that when the terms "up", "down", "inside", "outside" and the like indicate an orientation or positional relationship based on the orientation or positional relationship shown in the drawings or the orientation or positional relationship in which the product of the disclosure is customarily placed when used, they are used only for the purpose of facilitating the description of the present disclosure and simplifying the description, and are not indicative of or suggestive of the need for the device or element referred to be constructed and operated in a particular orientation, and therefore are not to be construed as limitations on the present disclosure.

In addition, when the terms "first", "second", etc., appear, they are used only for descriptive purposes of differentiation and are not to be understood as indicating or implying relative importance.

The terms "including", "comprising", or any other variant thereof, are intended to cover non-exclusive inclusion, so that a process, method, article or equipment comprising a set of elements includes not only those elements, but also other elements that are not explicitly listed, or that are inherent to such process, method, article or equipment. Without further limitation, the fact that an element is defined by the phrase "comprising a" does not exclude the existence of another identical element in the process, method, article or apparatus including the element.

Unless otherwise expressly provided and defined, the terms "configuration" and "connection" are to be understood in a broad sense, e.g. "connection" can be a fixed connection, a detachable connection or an integral connection; it can be a mechanical connection or an electrical connection; and it can be a direct connection or an indirect connection through an intermediate medium, or a communication within two elements. For those of ordinary skill in the art, the specific meanings of the above terms in the present disclosure can be understood on a case-by-case basis.

It is noted that features in embodiments of the present disclosure can be combined with each other without conflict.

As stated in the background art, existing applicator usually adopts absorbent material such as sponge, which, in use, needs to first adsorb the liquid on the surface of the material and then squeezes out the adsorbed liquid by pressing, which is inconvenient to operate with one hand when applying to the back.

In addition, the existing applicator needs to utilize the absorbency of the material when applying the liquid, so that the liquid adheres to the surface of the material, and the pressing force is put to squeeze out the liquid when applying, but the applicator will continue to adsorb the liquid after pressing, which leads to lower application efficiency, and thus the liquid cannot be fully utilized. The difficulty of cleaning sponge and other absorbent materials after absorption of liquid also increases. The contamination and hardening are inevitable after long-term use, which leads to be unusable.

Referring to FIG. 1-FIG. 7, the applicator and the application method provided in the embodiment of the present disclosure can solve the above problems, which will be described in detail next.

Figure 2:
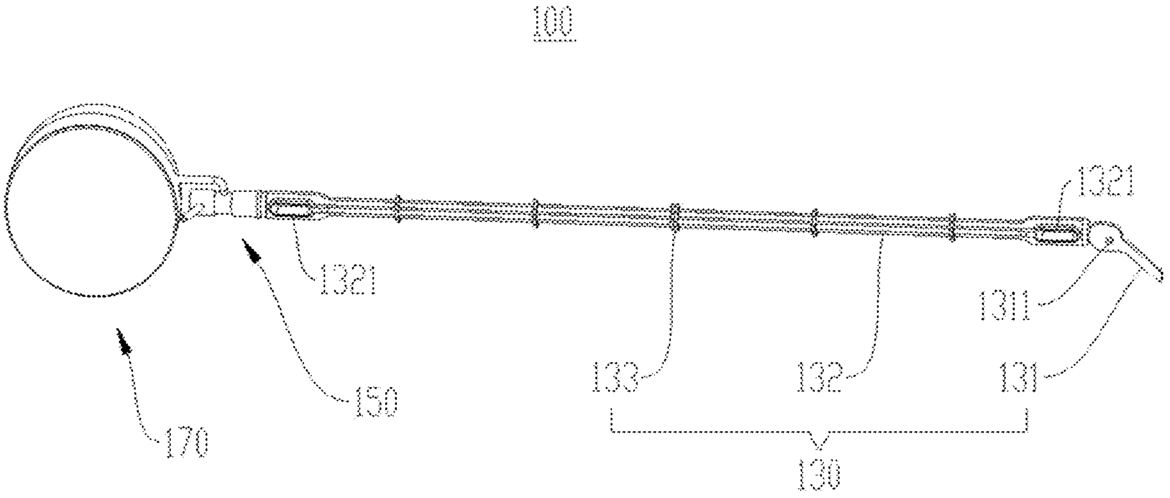
FIG. 2 is a structural schematic view of the applicator provided in an embodiment of the present disclosure in a second view.
Figure 3:
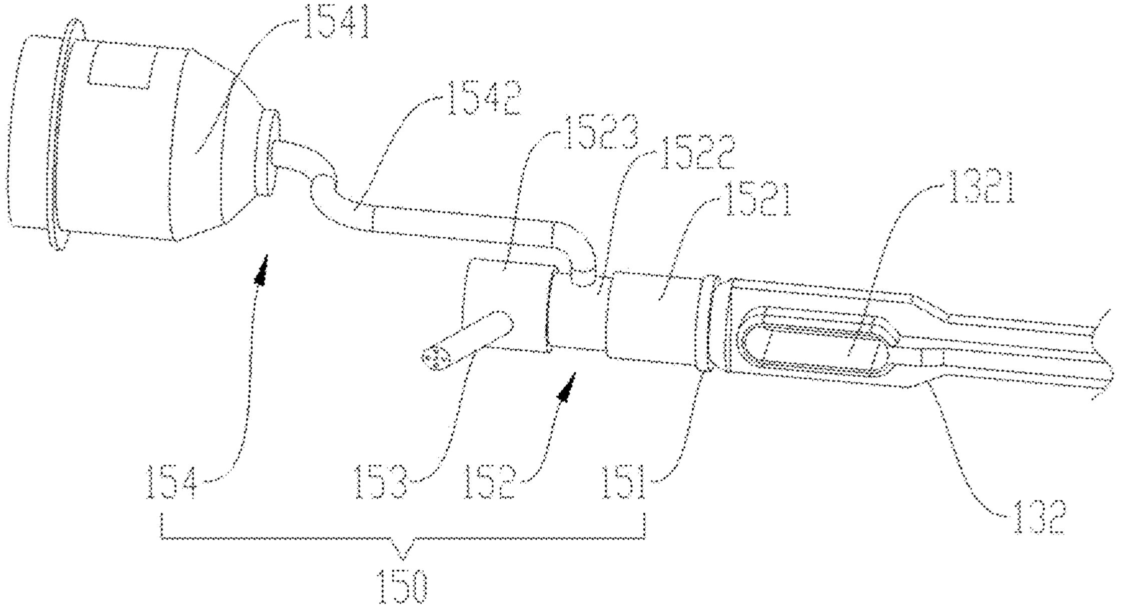
FIG. 3 is a structural schematic view of the spray member provided in an embodiment of the present disclosure in a first view.

Referring to FIG. 1-FIG. 3, the applicator 100 includes: a connecting member 110, a drive member 130, a spray member 150, and an applicator head 170, wherein the drive member 130, the spray member 150, and the applicator head 170 are mounted to the connecting member 110, and the drive member 130 is configured to move relative to the connecting member 110 to drive the spray member 150 to spray liquid.

The applicator 100 in use can achieve the application effect by operating the drive member 130 to drive the spray member 150 to spray the liquid, and then moving the applicator head 170 to contact with the liquid, and it can improve the convenience of one-handed operation when applying to the back.

Notably, a cavity is provided within the spray member 150 to hold liquid, and the cavity can be filled with liquid in advance before the installation of the spray member 150, or the cavity can be connected with a pipeline, such that liquid is continuously filled in through the pipeline while the spray member 150 sprays the liquid.

Moreover, because the single movement stroke of the drive member 130 is relatively fixed, the amount of liquid sprayed from the spray member 150 in a single time is also relatively fixed, thereby making the amount of liquid used by the applicator 100 in the use easier to control.

Referring to FIG. 1 and FIG. 2, the applicator head 170 has a planar plate 172 and a spherical plate 171 provided oppositely to each other, and the applicator head 170 is rotatably connected to the connecting member 110, such that the planar plate 172 or the spherical plate 171 can be controlled to contact with the human body in the process of applying, and the planar plate 172 has the advantage of a large contact area with high efficiency of applying when being in contact with the human body, whereas the spherical plate 171, when being in contact with the human body, has the advantages of applying with high precision and high degree of comfort. Therefore the applying can be selected according to the part to be applied as well as the personal needs of user.

Specifically, the planar plate 172 and the spherical plate 171 can be detachably connected, which can specifically be a threaded connection or a snap connection. When one of them is worn out or damaged, it can be individually replaced by the detachable connection, thereby reducing the cost of use.

Notably, the applicator head 170 is rotatably connected to the shield portion 113, which can be that at least two slots are provided on the shield portion 113, and at least two blocks are provided on the inner wall of the applicator head 170 to cooperate with the slots, so as to realize adjusting the relative circumferential angles of the applicator head 170 and shield portion 113 by cooperating blocks with different slots.

Moreover, the materials of planar plate 172 and the spherical plate 171 can both be non-absorbent materials. The liquid is ejected through the spray member 150, so that there is no need to adsorb the liquid for squeezing and releasing. Moreover, the adsorption of the liquid during the application process is avoided, which may affect the application effect. Because the planar plate 172 and the spherical plate 171 do not adsorb liquid, the applicator head 170 is easy to clean and does not produce stubborn dirt due to liquid adsorption and residue. The planar plate 172 and the spherical plate 171 can be made of plastic or rubber, the specific materials of which are not limited.

Certainly, the applicator head 170 can be made of panels of other shapes, including but not limited to beveled panels, curved panels, and special-shaped panels, as long as it is ensured that at least a part of the outer wall of the applicator head 170 is capable of contacting the application site, and the specific shapes of the constituent panels are not limited.

Referring to FIG. 1-FIG. 3, the connecting member 110 is of a detachable structure including a handle portion 111, an extension portion 112, and a shield portion 113 installed in sequence, wherein the handle portion 111, the extension portion 112, and the shield portion 113 are all of a hollow structure, which is convenient for accommodating the drive member 130 and the spray member 150. The end of the shield portion 113 away from the extension portion 112 is connected to the applicator head 170, and the end of the handle portion 111 away from the extension portion 112 is of a closed structure to avoid interference with the drive portion inside the handle portion 111. During use, the palm of the user can directly hold the handle portion 111 and then turn or rotate the drive portion through the fingers.

In this embodiment, the entire connecting member 110 is cylindrical, i.e., the connecting member 110 has a circular cross-section. The outer diameter of the extension portion 112 is the smallest, and the outer diameters of the handle portion 111 and the shield portion 113 are larger than the outer diameter of the extension portion 112; certainly, the outer diameter of the handle portion 111 can be the smallest or the outer diameter of the shield portion 113 can be the smallest, and the relationship between the outer diameters of the handle portion 111, the extension portion 112 and the shield portion 113 is not specifically limited.

Further, the shape of the entire connecting member 110 can also be a square cylinder, and the cross-section of the connecting member 110 can be triangular, rectangular, rhombic, pentagonal, and other shapes. In addition, from the viewpoint of improving aesthetics or utility, the cross-sections of the extension portion 112, the shield portion 113, and the handle portion 111 can be inconsistent, and the orderly connection among the components can be realized by installing a snap structure at the end portion.

In this embodiment, the shield portion 113 is of a circular truncated cone, and the outer diameter of the end away from the extension portion 112 is larger than the outer diameter of the end close to the extension portion 112, which ensures that the position where the applicator head 170 is connected to the shield portion 113 has sufficient strength to avoid the relative bending between the two. Similarly, the shield portion 113 can be of other shapes such as a frustum, a square cylinder, or the like.

Notably, the connecting member 110 can also be of a folding structure, i.e., the handle portion 111, the extension portion 112, and the shield portion 113 are bendable relative to each other; and the connecting member 110 can also be of a telescopic structure, i.e., the handle portion 111, the extension portion 112, and the shield portion 113 are telescopically mated with each other. No matter it is a folding structure or a telescopic structure, or a structure with both folding and telescopic functions, the space occupied by the overall connecting member 110 can be reduced, thereby having the effect of facilitating storage.

Referring to FIG. 2 and FIG. 3, the drive member 130 comprises a toggle 131 and a transmission rod 132 that are connected, the toggle 131 penetrates the connecting member 110, the transmission rod 132 is accommodated in an inner cavity of the connecting member 110, the end of transmission rod 132 away from the toggle 131 is connected to the spray member 150, and the toggle 131 is configured to rotate relative to the connecting member 110 to drive the spray member 150 to move through the transmission rod 132.

Specifically, one end of the toggle 131 is rotatably connected to the transmission rod 132, the other end of the toggle 131 extends through the handle portion 111, the transmission rod 132 is provided at the inner side of the extension portion 112, and the end of the transmission rod 132 away from the toggle 131 is connected to the pressing head 151. The handle portion 111 is provided with an extension groove 1112 to facilitate movement of the toggle 131 within the extension groove 1112. During use, the user can turn the toggle 131 to drive the transmission rod 132 to move in the axial direction within the extension portion 112 by the rotation of the toggle 131.

In addition, in order to ensure the flexible rotation of the toggle 131, the corners of the outer wall of the toggle 131 can be rounded, to avoid the existence of corners that hinder the rotation of the toggle 131.

Figure 5:
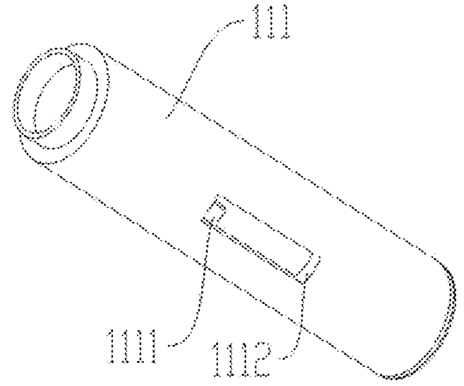
FIG. 5 is a structural schematic view of the handle portion provided in an embodiment of the present disclosure in a first view.
Figure 6:
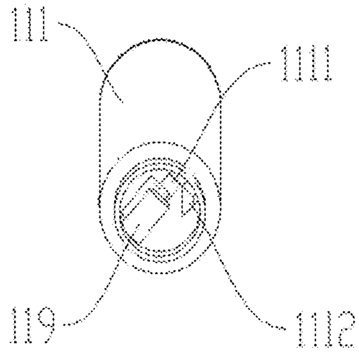
FIG. 6 is a structural schematic view of the handle section provided in an embodiment of the present disclosure in a second view.

Referring to FIG. 2 and FIG. 5, in order to improve the rotational stability of the toggle 131, the toggle 131 is provided with a pivot hole 1311, and the connecting member 110 is provided with a pillar 1111, wherein the pillar 1111 is accommodated in the pivot hole 1311, wherein the pillar 1111 can cooperate with the pivot hole 1311 to make the pillar 1111 as pivot when the toggle 131 rotates, thereby preventing the toggle 131 from easily undergoing an axial position change with respect to the handle portion 111.

In this embodiment, in order to ensure the transmission stability of the transmission rod 132, the transmission rod 132 is of a cross structure, i.e., the cross-section of the transmission rod 132 is cross-shaped. Certainly, under the premise of ensuring sufficient structural strength, the transmission rod 132 can also be cylindrical or prismatic, i.e., the cross-section of the transmission rod 132 can be circular, oval, prismatic, rectangular, triangular, and pentagonal, etc., and the specific shape of the transmission rod 132 is not limited.

In addition, because the transmission rod 132 has a certain extension length, the transmission rod 132 can be assembled by a plurality of sub-rods. Furthermore, to ensure radial or circumferential position stability of the transmission rod 132, the drive member 130 further comprises a guide block 133, which is mounted on the transmission rod 132 and cooperates with the connecting member 110.

In this embodiment, the cross-sectional shape of the pivot hole 1311 is circular, the corresponding pillar 1111 is also cylindrical, and the cross-section of the pillar 1111 is circular; certainly, the cross-sectional shapes of the support hole 1311 and the pillar 1111 can also be triangular, prismatic, rectangular, pentagonal, and other shapes, and the specific cross-sectional shapes thereof are not limited.

In this embodiment, the number of guide blocks 133 is five, wherein the five guide blocks 133 are provided at equally spaced intervals along the axial direction of the transmission rod 132, i.e., the guide blocks 133 located in the middle are equally spaced from the guide blocks 133 on both sides. Certainly, the number of guide blocks 133 can also be set to one, three, seven, etc., according to the demand, and the specific number of guide blocks 133 is not limited.

Referring to FIG. 2-FIG. 6, the transmission rod 132 is provided with a guide groove 1321, and the inner wall of the connecting member 110 is provided with a limit post 119, wherein the limit post 119 is accommodated in guide groove 1321.

Specifically, the handle portion 111 and the shield portion 113 are provided with limit posts 119. The guide groove 1321 is in the form of an elongated strip, wherein one guide groove 1321 corresponds to two limit posts 119, and the spacing between the two limit posts 119 is less than the extending length of the elongated strip of the guide groove 1321. Through the cooperation of the guide groove 1321 and the limit posts 119, the axial movement of the transmission rod 132 is limited, to avoid the axial movement of the transmission rod 132 from being too long and damaging the spray member 150.

In this embodiment, both ends of the transmission rod 132 are provided with guide grooves 1321; certainly, the number of guide grooves 1321 on the transmission rod 132 can also be one, three, five, etc., and the specific number of guide grooves 1321 is not limited.

Figure 4:
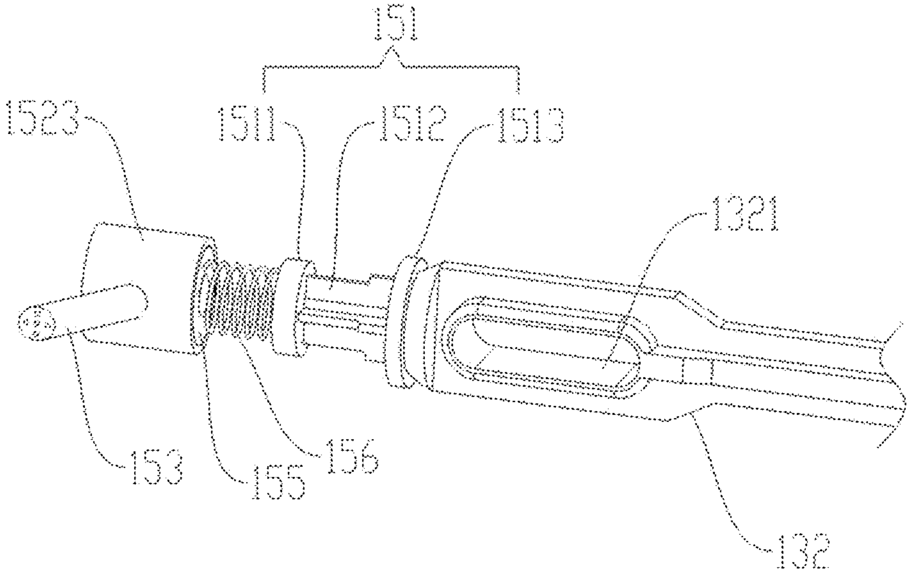
FIG. 4 is a structural schematic view of the spray member provided in an embodiment of the present disclosure in a second view.

Referring to FIG. 3 and FIG. 4, the spray member 150 comprises a pressing head 151, an inner cylinder 152, and a nozzle 153, the pressing head 151 and the inner cylinder 152 are housed in an inner cavity of the connecting member 110, the pressing head 151 is connected to the drive member 130 and cooperates with the inner cylinder 152, the nozzle 153 is in communication with the inner cylinder 152, the inner cylinder 152 is configured to hold a liquid, and the pressing head 151 is configured to move relative to the inner cylinder 152 to drive the nozzle 153 to spray the liquid.

Specifically, the pressing head 151 and the inner cylinder 152 are both accommodated in the shield portion 113, the nozzle 153 penetrates the side wall of the shield portion 113 for liquid ejection operation, the end of the pressing head 151 away from the inner cylinder 152 is connected to the transmission rod 132, and the transmission rod 132 is driven by the toggle 131 for circumferential movement while driving the pressing head 151 for axial movement. The inner cylinder 152 contains liquid, and the liquid in the inner cylinder 152 will be ejected through the nozzle 153 under the squeezing action of the axial movement of the pressing head 151.

Notably, to ensure that the liquid ejected from the nozzle 153 can smoothly contact with the applicator head 170, the nozzle 153 can be provided in an inclined manner, and the output end of the nozzle 153 is closer to the applicator head 170 relative to the input end. The inclined angle of the nozzle 153 relative to the inner cylinder 152 can be 15°, 30°, 45°, 60°, 75° and the like, the specific angle of which is not limited.

Certainly, in the case of ensuring that the applicator head 170 and the liquid can effectively contact, the nozzle 153 can be provided vertically relatively to the inner cylinder 152, or the nozzle 153 can be inclined, wherein the output end of the nozzle 153 is farther away from the applicator head 170 relative to the input end.

Notably, in order to improve the protection for the nozzle 153, the output end of the nozzle 153 can be flush with the cylinder wall of the connecting member 110, i.e., the output end of the nozzle 153 is flush with the side wall of the shield portion 113 to avoid the output end of the nozzle 153 from being provided on the outer side of the shield portion 113 to cause collision easily and damage to the nozzle 153.

Notably, in order to improve the coordination of the work of the spray member 150 and the applicator head 170, the nozzle 153 can also be mounted to the applicator head 170, and the nozzle 153 sprays the liquid while the applicator head 170 can immediately perform the application operation.

Referring to FIG. 4, in order to ensure high efficiency of the nozzles 153 in ejecting liquid, a plurality of nozzles 153 can be provided, and the plurality of nozzles 153 can all be provided on one side of the applicator head 170, or the plurality of nozzles 153 can be arranged around the applicator head 170. The output end of the nozzle 153 is provided with a plurality of spray holes, which allows the liquid to be divided into a plurality of fine streams to be sprayed from the spray holes, so as to avoid the liquid from being sprayed out in excess and wasted.

In this embodiment, the output end of the nozzle 153 is provided with five spray holes, wherein the five spray holes have the same size and shape and are all circular; certainly, the number of spray holes can also be one, three, eight, ten, etc., and the shape of the spray holes can be triangular, rectangular, rhombus, pentagonal, etc., and the number and the shape of the spray holes are not limited specifically.

Referring to FIG. 3 and FIG. 4, the inner cylinder 152 comprises a first segment 1521, a second segment 1522 and a third segment 1523 communicated in sequence, wherein the inner wall of the first segment 1521 cooperates with the pressing head 151, the third segment 1523 is communicated with the nozzle 153, both the first segment 1521 and the third segment 1523 have an inner diameter greater than the inner diameter of the second segment 1522.

In this embodiment, the inner cylinder 152 is in the shape of a step, and the inner and outer diameters of the second segment 1522 are smaller than the inner and outer diameters of the first segment 1521 and the third segment 1523 at the same time. The force on the inner cylinder 152 can be more stable by adopting the shape of the step; certainly, the inner and outer diameters of the first segment 1521 can be configured to be the smallest, or the inner and outer diameters of the third segment 1523 can be configured to be the smallest, and the specific shape of the step of the inner cylinder 152 is not limited.

Notably, the end surface of the second segment 1522 abuts against the pressing head 151, and the axial limiting effect on the pressing head 151 can be realized by the second segment 1522, so as to avoid the mating position of the pressing head 151 with the first segment 1521 from being too deep to damage the inner cylinder 152.

Certainly, in order to reduce the difficulty of machining the inner cylinder 152, the inner cylinder 152 can be straightly cylindrical. The inner cylinder 152 can be cylindrical or square cylindrical, i.e., the cross-sectional shape of the inner cylinder 152 can be circular, oval, rectangular, prismatic, triangular, and pentagonal, etc., and the specific shape and cross-sectional shape of the inner cylinder 152 are not limited.

Referring to FIG. 3, in order to improve the convenience of fluid supply, the spray member 150 further includes a fluid supply tank 154, wherein the fluid supply tank 154 is communicated with the inner cylinder 152, and the fluid supply tank 154 can be provided adjacent to the inner cylinder 152 or can be spaced apart from the inner cylinder 152; and the fluid supply tank 154 can be positioned on the inner side of the connecting member 110, or can be provided on the outer side of the connecting member 110.

In this embodiment, the fluid supply tank 154 includes a tank 1541 and a liquid tube 1542, wherein the tank 1541 is housed in the inner cavity of the applicator head 170, and the liquid tube 1542 is communicated between the tank 1541 and the inner cylinder 152, and by housing the tank 1541 inside the applicator head 170, the tank 1541 can be shielded and protected by the applicator head 170, and the overall footprint of the applicator 100 is not added.

Specifically, a part of the outer wall of the tank 1541 can be bonded to the inner wall of the applicator head 170, specifically to at least one from the planar plate 172 and the spherical plate 171; and the slot can be arranged at the inner wall of the applicator head 170, such that the tank 1541 is accommodated within the slot for positioning.

Moreover, a part of the liquid tube 1542 connected to the tank 1541 is also accommodated within the applicator 100, and a part of the liquid tube 1542 connected to the inner cylinder 152 is accommodated within the shield portion 113, thereby avoiding the liquid tube 1542 form being exposed outside and easily damaged by impact. In addition, the liquid tube 1542 is bent and the bending portion of the liquid tube 1542 is rounded to avoid the corner angle from being too large and affecting the liquid flow rate and flux.

Certainly, the tank 1541 can also be mounted within the connecting member 110, specifically on the inner side of the handle portion 111 or the extension portion 112 or the shield portion 113, or can be mounted on the outside of the connecting member 110 or the applicator head 170, the specific mounting position of which is not limited.

Figure 7:
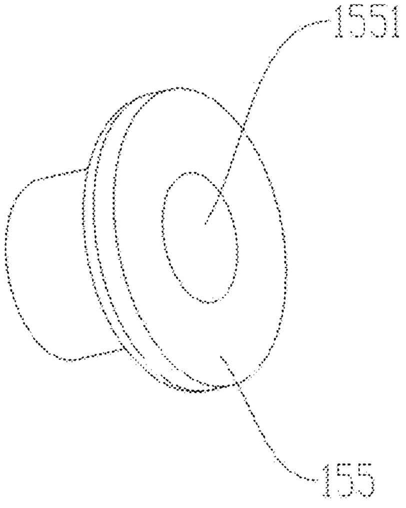
FIG. 7 is a structural schematic view of a rectifying ring provided in an embodiment of the present disclosure.

Referring to FIG. 4 and FIG. 7, the spray member 150 further includes a rectifying ring 155, wherein the rectifying ring 155 is installed in the inner cavity of the inner cylinder 152; specifically, the rectifying ring 155 is installed within the third segment 1523. The rectifying ring 155 is provided with a center hole 1551, through which the fluid can flow. In this embodiment, the rectifying ring 155 is of a circular truncated cone, and the end of the rectifying ring with a larger diameter is closer to the second segment 1522 relative to the end with a smaller diameter.

Notably, the rectifying ring 155 and the third segment 1523 can be in an interference fit or a threaded connection, and the specific connection mode between these two is not limited.

Referring to FIG. 3 and FIG. 4, the spray member 150 also includes a spring 156, which is installed in the inner cavity of the inner cylinder 152, and the two ends of the spring 156 are connected to the rectifying ring 155 and the pressing head 151 respectively. By providing the spring 156, on the one hand, the relative distance between the pressing head 151 and the rectifying ring 155 can be limited to prevent the distance between the two from being too small or too large; on the other hand, the spring 156 can exert an elastic tension or elastic pulling force on the pressing head 151, so that the kinetic energy of the pressing head 151 gradually decreases in the process of moving away from the rectifying ring 155, and the kinetic energy of the pressing head 151 also gradually decreases in the process of approaching the rectifying ring 155.

In addition, in the case where the user turns the toggle 131, the spring 156 can be synchronously stretched by the transmission rob 132 driving the pressing head 151 to move away from the rectifying ring 155, so that negative pressure is formed in the inner cylinder 152, and the liquid is pumped from the tank 1541 to the inner cylinder 152 through the liquid tube 1542; after the user disengages from the toggle 131, the spring 156 can be driven by its own elasticity to bring the pressing head 151 close to the rectifying ring 155, to exert a squeezing effect on the inner cylinder 152, such that the liquid in the inner cylinder 152 is sprayed out through the nozzle 153.

Referring to FIG. 3 and FIG. 4, the pressing head 151 comprises a pressing plate 1511, a guide plate 1512, and a carrier plate 1513 connected in sequence, wherein the pressing plate 1511 cooperates with the inner cylinder 152 and the carrier plate 1513 is connected to the drive member 130. Specifically, the pressing plate 1511 cooperates with the first segment 1521, the carrier plate 1513 is connected to the transmission rod 132, and the guide plate 1512 can be provided between the pressing plate 1511 and the carrier plate 1513 to avoid making the pressing head 151 be a solid structure, such that the material used is reduced in the case of ensuring the strength, thereby reducing the production cost.

Referring to FIG. 3 and FIG. 4, the end surface of the carrier plate 1513 abuts against the end surface of the inner cylinder 152; specifically, the end surface of the carrier plate 1513 abuts against the end surface of the first segment 1521, and axial movement of the pressing head 151 can be limited by the cooperation between the carrier plate 1513 and the end surface of the first segment 1521.

In this embodiment, both the pressing plate 1511 and the carrier plate 1513 are of a circular disc structure, and the thickness of the pressing plate 1511 is greater than the thickness of the carrier plate 1513. Certainly, it is also possible to make the thickness of the pressing plate 1511 less than or equal to the thickness of the carrier plate 1513, while ensuring structural strength.

Referring to FIG. 4, the guide plate 1512 is of a bifurcated structure; specifically, the guide plate 1512 is of a cross structure, i.e., the cross-section of the guide plate 1512 is cross-shaped. Certainly, under the premise of ensuring sufficient structural strength, the guide plate 1512 can also be cylindrical or prismatic, i.e., the cross-section of the guide plate 1512 can be circular, oval, prismatic, rectangular, triangular, and pentagonal, etc., and the specific shape of the guide plate 1512 is not limited.

Moreover, the guide plate 1512 includes a plurality of sub-plates, and the width of the end of each sub-plate close to the pressing plate 1511 is smaller than the width of the end of the guide plate 1512 close to the carrier plate 1513, such that the sub-plates and the entire guide plate 1512 present a certain streamlined shape in the axial direction, on the one hand, to fit with the shape of the pressing plate 1511 and the carrier plate 1513, and on the other hand, to facilitate the flow of the airflow between the pressing plate 1511 and the carrier plate 1513, thereby avoiding that the airflow gathers between these two.

An application method, which is applied to the above applicator 100, specifically comprises:

S1: controlling a drive member 130 to move and drive the spray member 150 to move;

S2: spraying the liquid through the spray member 150; and

S3: controlling the applicator head 170 to move for an application operation.

The foregoing is only a specific embodiment of the present disclosure, but the scope of protection of the present disclosure is not limited thereto, and any changes or substitutions that can be readily thought of by any person of ordinary skill in the art within the scope of the technology disclosed herein shall be covered by the scope of protection of the present disclosure. Therefore, the scope of protection of the present disclosure shall be governed by the scope of protection of the stated claims.

INDUSTRIAL APPLICABILITY

In the process of using the applicator 100, the toggle 131 can be rotated to drive the movement of the spray member 150 to spray the liquid, and the overall process can be executed with one hand and is easy to operate; and the applicator head 170 can also avoid adsorption when applying the liquid, on the one hand, the liquid is fully used to avoid waste, and on the other hand, the applicator head 170 is made easy to be cleaned.

What is claimed is:

1. An applicator, wherein the applicator comprises:

a connecting member, a drive member, a spray member, and an applicator head, wherein the drive member, the spray member, and the applicator head are mounted to the connecting member, and the drive member is configured to move relative to the connecting member to drive the spray member to spray a liquid, wherein the spray member comprises a pressing head, an inner cylinder, and a nozzle, wherein the pressing head and the inner cylinder are housed in an inner cavity of the connecting member, the pressing head is connected to the drive member and cooperates with the inner cylinder, the nozzle is in communication with the inner cylinder, the inner cylinder is configured to hold the liquid, and the pressing head is configured to move relative to the inner cylinder to drive the nozzle to spray the liquid.

2. The applicator according to claim 1, wherein an output end of the nozzle is flush with a cylinder wall of the connecting member.

3. The applicator according to claim 1, wherein the applicator further comprises a fluid supply tank, wherein the fluid supply tank is communicated with the inner cylinder.

4. The applicator according to claim 3, wherein the fluid supply tank comprises a tank and a fluid tube, wherein the tank is housed in an inner cavity of the applicator head, and the fluid tube is communicated between the tank and the inner cylinder.

5. The applicator according to claim 1, wherein the inner cylinder comprises a first segment, a second segment and a third segment communicated in sequence, wherein an inner wall of the first segment cooperates with the pressing head, the third segment is connected to the nozzle, both the first segment and the third segment have an inner diameter greater than an inner diameter of the second segment.

6. The applicator according to claim 5, wherein the inner diameter of the second segment is smaller than the inner diameter of the first segment, and an end surface of the second segment abuts against the pressing head.

7. The applicator according to claim 1, wherein the spray member further comprises a rectifying ring, wherein the rectifying ring is installed in an inner cavity of the inner cylinder.

8. The applicator according to claim 7, the spray member further comprises a spring, wherein the spring is mounted in the inner cavity of the inner cylinder, and two ends of the spring are connected to the rectifying ring and the pressing head, respectively.

9. The applicator according to claim 1, wherein the pressing head comprises a pressing plate, a guide plate and a carrier plate connected in sequence, wherein the pressing plate cooperates with the inner cylinder and the carrier plate is connected to the drive member.

10. The applicator according to claim 9, wherein an end surface of the carrier plate abuts against an end surface of the inner cylinder.

11. The applicator according to claim 10, wherein a width of an end of the guide plate close to the pressing plate is less than a width of an end of the guide plate close to the carrier plate.

12. The applicator according to claim 1, wherein the drive member comprises a toggle and a transmission rod that are connected, wherein the toggle penetrates the connecting member, the transmission rod is accommodated in an inner cavity of the connecting member, an end of the transmission rod away from the toggle is connected to the spray member, and the toggle is configured to rotate relative to the connecting member to drive the spray member to move through the transmission rod.

13. The applicator according to claim 12, wherein the toggle is provided with a pivot hole, the connecting member is provided with a pillar, and the pillar is accommodated in the pivot hole.

14. The applicator according to claim 12, wherein the drive member further comprises a guide block, wherein the guide block is mounted on the transmission rod and cooperates with the connecting member.

15. The applicator according to claim 12, the transmission rod is provided with a guide groove, an inner wall of the connecting member is provided with a limit post, and the limit post is accommodated in the guide groove.

16. The applicator according to claim 1, wherein the applicator head is provided with a planar plate and a spherical plate oppositely disposed, and the applicator head is rotatably connected to the connecting member.

17. The applicator according to claim 1, wherein the connecting member is of a folding construction, and/or the connecting member is of a telescopic construction.

18. An application method, wherein the application method is applied to the applicator according to claim 1, and the application method comprises:

controlling the drive member to move and drive the spray member to move;

spraying the liquid through the spray member; and controlling the applicator head to move to perform an application operation.

19. An applicator, wherein the applicator comprises:

a drive member, a connecting member, a spray member, a fluid supply tank, and an applicator head, wherein the drive member, the spray member, and the applicator head are mounted to the connecting member, the fluid supply tank holds a liquid and is in communication with the spray member, and the drive member is configured to move relative to the connecting member to drive the spray member to spray the liquid, and wherein the spray member comprises a pressing head, an inner cylinder, and a nozzle, wherein the pressing head and the inner cylinder are housed in an inner cavity of the connecting member, the pressing head is connected to the drive member and cooperates with the inner cylinder, the nozzle is in communication with the inner cylinder, the inner cylinder is configured to hold the liquid, and the pressing head is configured to move relative to the inner cylinder to drive the nozzle to spray the liquid.

* * * * *